Patented Oct. 18, 1938

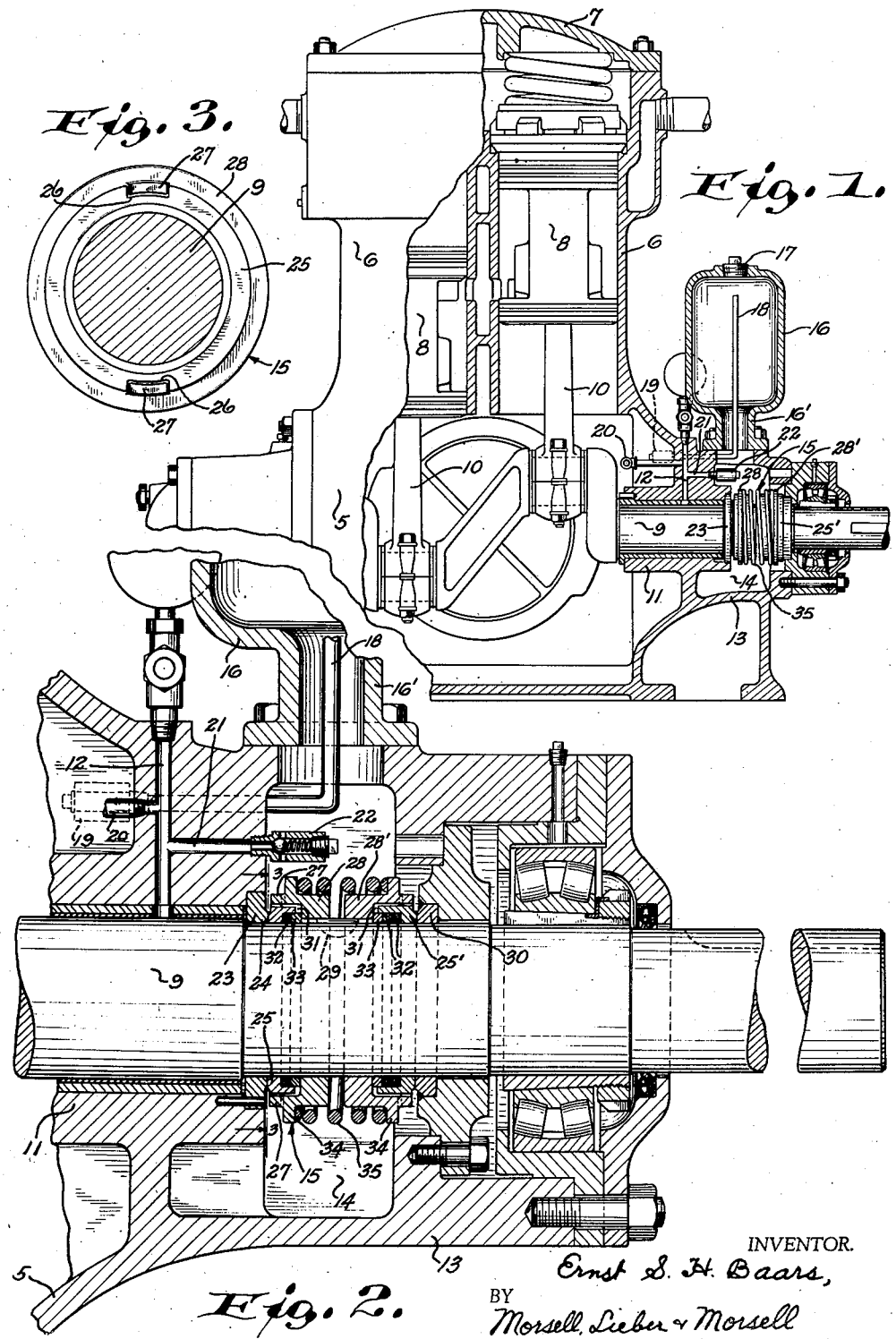

2,133,524

UNITED STATES PATENT OFFICE 2,133,524

OIL SEAL AND RESERVOIR CONSTRUCTION FOR COMPRESSOR CRANKSHAFTS

Ernst S. H. Baars, Milwaukee, Wis., assignor to The Vilter Manufacturing Company, Milwaukee, Wis., a corporation of Wisconsin Application February 1, 1937, Serial No. 123,418

1 Claim. (Cl. 286—9)

The present invention relates to improvements in oil seal and reservoir constructions for compressor crank shafts.

In compressors adapted for compressing gaseous refrigerants, special provision has to be made for preventing the escape or leakage of refrigerant around the projecting portion of the crank shaft and through the bearings therefor. It is common practice to provide chambered portions in a compressor of this type, for holding a body of oil which is used for lubrication of the working parts of the compressor, and it is furthermore common practice generally, to utilize portions of this body of oil for the purpose of providing an oil seal about the stuffing box for the crank shaft.

Compressors of the type under consideration are frequently shut down for long periods and in the event of a long shut-down, there may be oil losses or oil drainage from the stuffing box to such an extent that the sealed portion of the shaft is no longer surrounded by oil. If this contingency results and if the compressor is again set into operation, the seal for the crank shaft will be ineffective and gas leakage will occur.

It is therefore the primary object of the present invention to provide an oil seal construction for compressor crank shafts of such a character that impairment of the level of oil in and around the stuffing box is not possible so that an effective seal will always be provided regardless of the length of shutdown of the apparatus.

A further object of the invention is to provide, in a refrigerant compressor, an auxiliary oil reservoir which will insure an adequate supply of oil for the oil seal stuffing box at all times and under all conditions.

A further object of the invention is to provide in a refrigerant compressor, an oil reservoir located above the crank shaft stuffing box cr seal chamber and arranged to maintain an adequate supply of oil in said seal chamber, said reservoir further having a gas relief and overflow connection extending into the crank case of the compressor.

A further object of the invention is to provide an oil seal construction for a compressor crank shaft wherein a seal chamber is supplied with oil from a reservoir, and which reservoir is in communication with the interior of the crank case, the flow of oil from the seal chamber to the crank case being prevented by means of a check valve.

A further object of the invention is to provide an oil seal and reservoir construction for compressor crank shafts wherein the reservoir is adapted to retain a substantial amount of oil which circulates through the system and which serves the purpose, among other things, of forming an oil cooling chamber.

A further object of the invention is to provide a novel form of stuffing box construction for a compressor crank shaft wherein the danger of leakage is obviated and wherein the packing material is always tightly compacted without danger of excessive wear on the contacting metallic members.

A further object of the invention is to provide an oil seal and reservoir construction for compressor crank shafts which is of very simple construction, which is efficient in operation, which is strong and durable, and which is well adapted for the purposes set forth.

With the above and other objects in view, the invention consists of the improved oil seal and reservoir construction for compressor crank shafts, and their parts and combinations as set forth in the claim, and all equivalents thereof.

In the accompanying drawing in which the same reference characters indicate the same parts in all of the views:

Fig. 1 is a fragmentary side view of a refrigerant compressor equipped with the improved oil seal and reservoir construction, parts being broken away and in vertical section to show structural details;

Fig. 2 is an enlarged fragmentary detail sectional view of the portion of the compressor enclosing an end of the crank shaft sealed by the improved stuffing box or seal construction, and showing the reservoir in communication therewith; and Fig. 3 is a transverse detail sectional view taken on the line 3—3 of Fig. 2.

Referring to the drawing, the compressor shown therein comprises in general a crank casing 5 and a pair of vertical cylinders 6 cast thereabove and integral therewith. A cylinder head 7 is detachably secured to and encloses the upper ends of the cylinders 6, and a piston 8 is reciprocable in each of the cylinders. A crank shaft 9 extends through the crank casing 5 and is journaled in suitable bearings and said crank shaft 9 carries connecting rods 10 connected at their upper ends with the pistons.

The driving end of the crank shaft 9 projects through a bored opening in a hub portion 11 and is surrounded by a sleeve which receives lubricant through a duct 12, it being understood that the crank case is always intended to contain an abundant supply of oil. Adjacent the outer end of the hub portion 11, there is an enclosed casing portion 13 within which there is a stuffing box or oil seal chamber 14. That portion of the drive shaft 9 which extends through the chamber 14 is surrounded by an improved stuffing box indicated generally by the numeral 15, and constituting an important feature of the present invention.

There is mounted on the upper portion of the casing 13, above the chamber 14, an oil reservoir 16. This oil reservoir is of circular formation in cross section and has a lower tubular reduced neck portion 16' provided with an opening in registration with an upper opening in the casing 13 and communicating with the chamber 14. The upper end of the reservoir 16 is closed except for a removable threaded plug 17 and a tubular gas relief and overflow connection 18 extends vertically through the neck portion 16' of the reservoir and has its open upper end terminating somewhat below the top of the reservoir. The other end of said gas relief and overflow connection 18 extends through a casing wall portion and opens into the crank shaft chamber and said discharge end of the connection is provided with a suitable check valve 19.

As previously indicated, the interior of the crank casing is normally supplied with an adequate body of lubricant which, during rotation of the crank shaft 9, is pumped into the cylinders 6 and over and around the various bearings and working parts of the apparatus. Oil is also pumped through a pipe or connection 20 which communicates with the duct or connection 12 previously mentioned. The duct or connection 12 is provided with a branch 21 communicating with the interior of the stuffing box chamber 14. The outer end of said connection 21 is provided with a check valve 22 so that under certain conditions oil can enter the chamber 14, but oil will not flow from the chamber 14 through the connections back to the interior of the crank casing. It is, of course, desirable that the interior of the chamber 14 be constantly filled with oil and for that purpose the reservoir 16 is adapted to contain a substantial level of oil, thereby insuring a maintenance of the chamber 14 in filled condition. If for any reason the reservoir becomes too full, the excess oil can overflow through the connection 18 and drain back to the interior of the crank casing. The connection 18 also provides a gas relief duct.

Due to the fact that the portion of the crank shaft within the chamber 14 is surrounded by oil, it is of course essential to guard against oil leakage and to have some means in addition to the surrounding oil, to prevent gas leakage in both directions. For this reason, said portion of the shaft 9 is surrounded by the improved oil seal or stuffing box 15. Adjacent the outer end of the hub portion 11 and surrounding the shaft 9, there is a fixed bearing plate 23 having a surface 24 adapted to be contacted by an adjacent surface portion of a revoluble inner ring 25. Said ring 25 is formed with a pair of oppositely disposed peripheral recesses 26 into which lateral tongues 27 of the outer ring 28 project. Said outer ring 28, as well as the companion outer ring 28', slightly spaced therefrom, are both keyed to the shaft 9 by a suitable key 29, whereby said members 28 and 28' turn with the shaft but are free to move longitudinally on the shaft to a limited extent. The companion ring 28' surrounds and engages an inner ring 25' in a manner similar to the engagement of the rings 25 and 28, the rings 25 and 25' being similarly constructed. The ring 25' makes surface contact with a fixed plate portion 30. The inner rings 25 and 25' are each formed with recesses and overhanging shoulders, which shoulders project into inner recesses 31 in the rings 28 and 28'. Within the recesses of the rings 25 and 25', there are rings of packing material 32 adapted to be maintained in compressed condition against the recessed portion of the rings 25, 25' by metallic compressing rings 33. Outer end portions of the outer rings 28 and 28' have peripheral flanges 34 and the external body portions of the two rings 28 and 28' are surrounded by a coiled spring 35 which is engaged at its ends with the flanges 34 and the expansive force of the spring causes longitudinal separation of the rings 28 and 28'. This force against said rings 28 and 28' urges the rings tightly against the metallic compressing rings 33 which in turn compress the packing rings 32 against the inner rings 25 and 25'. The force of the spring also tends to hold the face portions of the rings 25 and 25' against the contacting surface portions of the members 23 and 30.

With the improved seal and reservoir construction, it will be evident that the stuffing box chamber 14 is always filled with oil and the level therein is constantly maintained by the reservoir 16. Inasmuch as the reservoir 16 stores an adequate amount of oil, it will also serve as a medium for keeping the oil supply cooled. If the machine is shut down for any long period, and suffers loss of oil, the supply of oil in the reservoir will insure an adequate level of oil in the chamber 14 so as to provide complete enclosure for the stuffing box 15. Hence, when the machine is again started, even after a long period of idleness, there will be sufficient oil in the stuffing box chamber to immediately provide the necessary oil seal.

When the machine is set into operation, the crank shaft 9 of course revolves and the compressor functions in the usual manner. With respect to the oil seal and stuffing box arrangement, it is to be noted that the outer rings 28 and 28' revolve with the shaft and the spring 35 urges the same longitudinally away from each other so as to compact the packing rings 32 and to maintain a tight seal around the shaft with the faces of the members 25 and 25' in firm contact with their respective members 23 and 30. This arrangement provides a very effective means for preventing leakage along the shaft and in addition thereto, the fact that the stuffing box is entirely surrounded by the oil prevents any leakage of gas from the apparatus.

The improved oil seal and reservoir construction for the compressor shafts is furthermore of simple and novel construction and is well adapted for the purposes described.

What is claimed as the invention is:—

In a gas compressor having a crank case and a revolving shaft extending therefrom outwardly, an enclosure forming a seal chamber for an outer portion of the shaft, the crank case and seal chamber being adapted to contain fluid, an oil reservoir mounted above the seal chamber and connected therewith and also with the crank case to maintain a head of oil in the seal chamber, and a stuffing box within the enclosure and surrounding the shaft portion therewithin and submerged in oil, said stuffing box including a pair of stationary contact plates at opposite ends of the enclosure and through which the shaft passes, spaced inner rings loose on the shaft and each having surface contact with a contact plate, a pair of outer rings keyed to the shaft for longitudinal movement thereon and turning movement therewith, each outer ring surrounding and engaging an inner ring so as to turn the latter, adjacent portions of the respective inner and outer rings being recessed, packing rings surrounding the shaft and lodged in said recesses, and a coiled spring surrounding the outer rings and exerting force against both of the same in opposite directions to cause the outer rings to compact the packing rings against the inner rings and to force the inner rings against their contact plates.

ERNST S. H. BAARS.